United States Patent Office 3,027,370
Patented Mar. 27, 1962

3,027,370
DERIVATIVES OF GUANIDINE
Jakob Bindler, Riehen, near Basel, Switzerland, assignor to J. R. Geigy A.-G., Basel, Switzerland
No Drawing. Filed June 8, 1959, Ser. No. 818,536
Claims priority, application Switzerland June 20, 1958
11 Claims. (Cl. 260—256.4)

The present invention concerns a process for the production of biocidal guanidine compounds either in ring form or having open chains. It also concerns the new, open chained guanidine compounds themselves.

It has been found that valuable biocidal, linear or cyclic guanidine compounds are obtained by reacting a diamino compound of the general Formula I

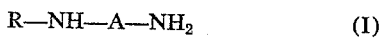

with an S-alkyl or S-aralkyl isothiourea while splitting off the corresponding mercaptan to form a guanidine compound of the general Formula II

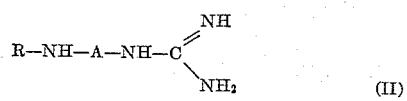

and converting this by warming while splitting off ammonia, into 2-imino- or 2-amino-1.3-dinitrogen heterocycles of the general Formula III

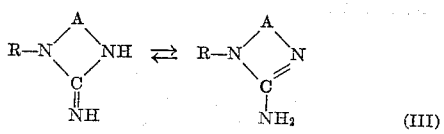

In the Formulae I, II and III

A represents a bivalent saturated hydrocarbon radical selected from the group consisting of $\alpha,\beta$-alkylene, $\alpha,\gamma$-alkylene and $\alpha,\beta$-cyclohexylene radicals, R represents a lipophilic radical selected from the group consisting of dodecylbenzyl and $C_{10}$ to $C_{14}$ alkyl radicals.

Compounds according to the invention in which R is a dodecyl or tetradecyl radical are particularly active biocides.

The following radicals are examples of A in the Formulae I to III: alkylene radicals such as 1.2-ethylene, 1.2-propylene, 1.2- or 2.3 butylene, 1.3-propylene, 2-methyl-1.3-propylene radicals and cycloalkylene radicals such as 1.2-cyclohexylene radicals.

Examples of compounds of the general Formula I which can be used according to the invention are: N-decyl-1.2-diaminoethane, N-dodecyl - 1.2 - diaminoethane, N-tetradecyl-1.2-diaminoethane, N-(4' - dodecyl-benzyl) - 1.2-diaminoethane, N-dodecyl-1.3-diamino-propane and N-dodecyl-1.2-diaminocyclohexane.

Examples of substituted isothioureas are: lower S-alkyl isothioureas such as, e.g. S-methyl-, S-ethyl-, S-propyl- or S-isopropyl- isothiourea or S-aralkyl isothioureas such as, e.g. S-benzyl isothiourea.

The compounds of the Formula II are obtained by reacting at room temperature 1 mol of N-substituted diamino compound of the general Formula I and 1 mol of an S-substituted isothiourea, preferably in the form of a salt of a strong acid such as, e.g. a hydrohalide. Advantageously, the reaction is performed in an organic solvent, e.g. methyl alcohol, the solution being heated to about 80° towards the end of the reaction in order to remove the mercaptan which is split off.

If the guanidine compound so obtained of the general Formula II is heated to 120–150°, then the ring is closed whilst ammonia is split off to form the corresponding salt of 2-imino-1.3-di-N-heterocycle. If, however, it is intended from the start to produce the 2-imino-1.3-di-N-heterocycle, then it is not necessary to first isolate the open chained guanidine compound and then convert it into the desired heterocyclic end product. The reaction mixture can be heated direct to 120–150° while distilling off the solvent and the pure 2-imino-1.3-di-N-heterocycle is obtained direct after recrystallisation of the residue.

The free bases of the Formula I or III are obtained by adding equivalent amounts of strong alkalies, e.g. sodium or potassium alcoholate either to the hydrohalide of the linear guanidine or to the hydrohalide of the 2-imino-1.3-di-N-heterocycle. It is of advantage however, to retain and use the guanidine compounds in the form of their salts, for example, in the form of their hydrochlorides.

The linear and cyclic guanidine compounds used according to the invention are colourless to pale coloured, crystalline to waxy substances which are stable to light and, in the form of their salts with acids, they are soluble in water. The compounds are valuble biocidal agents which are distinguished by their great range of action and good bactericidal activity. They also have an algaecidal action. The agents can be used either alone, or in solution or mixed with other biocidal substances as well as in inert carriers or fillers, ointment bases, creams and so forth. They can be used for the most varied purposes. For example they are good disinfectant and antiseptic agents which can be well used in human and veterinary medicine as they have good to very good activity against staphylococci, coli, typhoid, paratyphoid and enteritis bacilli. Because of the good water solubility of their salts with acids, the new compounds can be used advantageously for the disinfectant and antiseptic treatment of textiles, for example of woolen blankets, restaurant and hotel linen. Textile fabric which is treated with a 1 to 2% aqueous solution of the compounds according to the invention is, after drying, not only free from germs but also has a bacteriostatic action of a certain duration. Textiles so treated do not become yellow after storing or exposure to light for a long time. The products according to the invention can also be used in organic solvents for the dry cleaning of textiles. Also, they can be used for room disinfection, advantageously in the form of sprays and aerosols. They can also be used for the disinfection of apparatus and equipment in the household or in the foodstuff and fermentation branches of industry. Finally, they can also be used in cosmetics for example in ointments and creams.

Further details can be seen from the following examples which do not limit the invention in any way. In these examples parts are given as parts by weight and the temperatures are in degrees centigrade. The relationship of parts by weight to parts by volume is as that of kilogrammes to litres.

EXAMPLE 1

*1-Decyl-2-Iminoimidazolidine Hydrochloride*

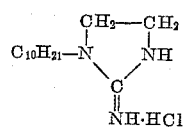

40.5 parts of S-benzyl isothiourea hydrochloride are added to the cold solution of 40 parts of N-decyl-1.2-diaminoethane in 100 parts by volume of methyl alcohol. The mixture is stirred first for 90 minutes at room temperature and then refluxed for 4 hours. The guanidine compound of the following composition

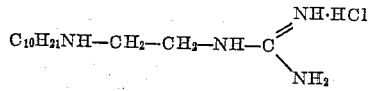

is formed while benzyl mercaptain is split off. This $\beta$- decylaminoethyl guanidine hydrochloride is obtained as a white crystal powder which decomposes at 111° if the methyl alcohol is removed in the vacuum and the residue is recrystallised from ethyl acetate. The product has a very good biocidal action. It is active, for example, against the following bacteria: Staphylococci such as *Staphylococcus aureus* spec., *Escherichia coli, Bacillus mensentericus* and *Sarcina* spec. It can therefore be used as active component in disinfectants, for example, in ointments, tinctures, as additive to cleansing agents and in antiseptic bandages. To produce 1-decyl-2-iminoimidazolidine hydrochloride, the methyl alcoholic solution of the β-decylaminoethyl guanidine hydrochloride is distilled in a sloping condenser (without isolating the above guanidine compound) and the residue is heated for 1 hour at 130–135°. It is dissolved in 200 parts by volume of hot ethyl acetate. The hot solution is filtered and cooled to —10°. The crude 1-decyl-2-imino-imidazolidine hydrochloride crystallises out and is filtered off. A yield of 47 parts (90% of the theory) of a colourless crystal powder (M.P. 93–95°) is obtained. A more pure product which melts at 101–103° is obtained by recrystallising once from ethyl acetate.

If, in the above process, instead of N-decyl-1.2-diaminoethane, equivalent amounts of N-decyl-1.2-diaminopropane or of N-decyl-1.2- or -2.3-diaminobutane are used, then compounds having a similar action are obtained.

EXAMPLE 2

*1-Dodecyl-2-Iminoimidazolidine Hydroiodide*

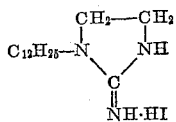

The mixture of 45.6 parts of N-dodecyl-1.2-diaminoethane, 43.6 parts of S-methyl isothiourea hydroiodide and 150 parts by volume of methyl alcohol is stirred for 1 hour at room temperature and then refluxed for 5 hours. The solution is then filtered and the methyl alcohol is removed from the filtrate in the vacuum. The residue recrystallised from ethyl acetate is a colourless crystal powder which melts at 103–104°. The β-dodecylaminoethyl guanidine hydroiodide of the formula

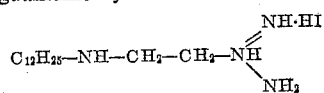

has similar biocidal properties to the guanidine derivative described in Example 1 and can be used for the same purposes. If the β-dodecylaminoethyl guanidine hydroiodide is heated for 1 hour at 120–130°, then after recrystallisation from 100 parts by volume of ethyl acetate, 1-dodecyl-2-iminoimidazolidine hydroiodide is obtained as a white crystal mass which melts at 89–90°. The yield is 61 parts, corresponding to 80% of the theoretical.

EXAMPLE 3

*1-Dodecyl-2-Iminoimidazolidine Sulphate*

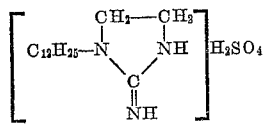

The mixture of 45.6 parts of N-dodecyl-1.2-diaminoethane, 27.8 parts of S-methyl isothiourea sulphate and 50 parts by volume of methyl alcohol is stirred at room temperature for 3 hours and then refluxed for 5 hours. The solution obtained is purified by filtering and the filtrate is concentrated by distilling off the methyl alcohol until a thick mass which can hardly be stirred is obtained. 50 parts by volume of N-amyl alcohol are added to the mass and it is heated for 4 hours at 140–150° while continuing the distillation off of the solvent. The residue is then evaporated to dryness in the vacuum, dissolved in methyl alcohol, decolourised with animal charcoal and the solvent is again removed in the vacuum whereupon the N-dodecyl-2-iminoimidazolidine sulphate is obtained. This is a waxy mass. A yield of 57 parts, corresponding to 94.5% of the theoretical, is obtained.

*Analysis.*—$SO_4$ ion: found, 15.2%; calculated, 15.9%. N found, 14.06%; calculated, 13.9%.

The salt is water soluble and has a disinfectant action.

EXAMPLE 4

*4.5-Tetramethylene-1-Dodecyl-2-Iminoimidazolidine Hydroiodide*

13.2 parts of S-methyl-isothiourea hydroiodide are added at room temperature to the solution of 17.1 parts of N-dodecyl-1.2-diaminocyclohexane in 50 parts by volume of methyl alcohol. After 1 hour, the guanidine compound of the formula

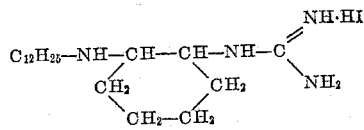

is obtained whereupon the solution is boiled for 3 hours. The solvent is distilled off through a sloping condenser and the residue is stirred for 2 hours at 140–150°. The residue is dissolved in 70 parts by volume of hot ethyl acetate and purified by filtration. After cooling to —10°, 19.5 parts (a yield of 72% of the theoretical) of 1-dodecyl -2- imino-4.5-tetramethylene-imidazolidine hydroiodide of the formula

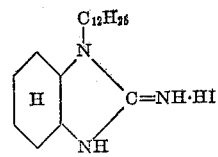

crystallises out. The crystals are filtered off, washed with a little petroleum ether and dried. M.P. 92–93°.

If in the above process, instead of 17.1 parts of N-dodecyl-1.2-diaminocyclohexane, 15.3 parts of N-decyl-1.2-diaminocyclohexane or 18.9 parts of N-tetradecyl-1.2-diaminocyclohexane are used, then compounds having similarly good biocidal properties are obtained.

EXAMPLE 5

*1-Tetradecyl-2-Iminoimidazolidine Hydrochloride*

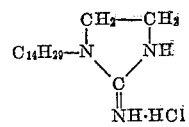

The solution of 51.2 parts of N-tetradecyl-1.2-diaminoethane and 25.3 parts of S-methyl isothiourea hydrochloride in 100 parts by volume of methyl alcohol is stirred first for 2 hours at room temperature and then for 5 hours at the boiling point of the solvent. The reaction solution, which contains the condensation product of the following constitution

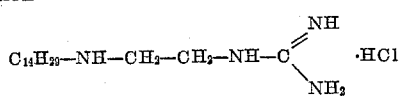

is purified by filtration and the methyl alcohol is distilled off in the vacuum.

The residue, which mainly consists of β-tetradecylaminoethyl guanidine hydrochloride, is recrystallised from ethyl acetate. The β-tetradecylaminoethyl guanidine hydrochloride is a colourless crystalline powder which decomposes at 130°. It has biocidal properties similar to the guanidine derivative described in Example 1 and can be used for the same purposes.

To produce 1-tetradecyl-2-iminoimidazolidine hydrochloride, the methyl alcoholic solution of the β-tetradecyl-aminoethyl guanidine hydrochloride (without isolating this substance) is concentrated through a sloping condenser until a tough mass is obtained which can hardly be stirred. 10 parts by volume of N-amyl alcohol are added to the mass, the whole is heated to 130–140° and dissolved in 200 parts by volume of hot ethyl acetate. On cooling to −10°, 58 parts (a yield of 91.5%) of 1-tetradecyl-2-iminoimidazolidine hydrochloride crystallises out. M.P. 150–152°. A more pure product is obtained by recrystallising once from ethyl acetate. M.P. 158–159°.

EXAMPLE 6

*1-Dodecyl-2-Iminohexahydropyrimidine Hydrochloride*

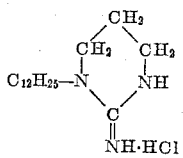

48.4 parts of N-dodecyl-1.3-diaminopropane and 25.3 parts of S-methyl isothiourea hydrochloride are dissolved in 100 parts by volume of methyl alcohol. This solution is stirred for 1½ hours at room temperature and then refluxed for 5 hours. The γ-dodecyl-aminopropyl guanidine hydrochloride

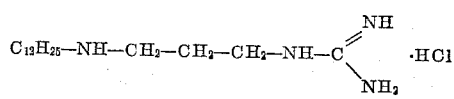

crystallises out on cooling. It is filtered off and is recrystallised from a mixture of ethyl alcohol and ethyl acetate. It is a water soluble, colourless powder which melts at 137–138°. It has similar biocidal properties to the guanidine derivative described in Example 1 and can be used for the same purposes.

If in the above process instead of N-dodecyl-1.3-diaminopropane, equivalent amounts of N-(4′-dodecylbenzyl)-1.3-diaminopropane or N-dodecyl-1.3-diamino-2-methyl propane are used, then compounds which also have a good action are obtained.

If, instead of the 25.3 parts of S-methyl isothiourea hydrochloride, 40.5 parts of S-benzyl isothiourea hydrochloride are used and otherwise the same procedure is followed, then similarly good yields are obtained.

To produce the 1-dodecyl-2-iminohexahydropyrimidine hydrochloride, the guanidine compound does not need to be isolated. The methyl alcohol which contains the γ-dodecylaminopropyl guanidine hydrochloride is distilled off through a sloping condenser and the residue is heated for 3 hours at 140–150°. It is then dissolved in 200 parts by volume of hot ethyl acetate, purified by filtration and the solution is cooled to −15° whereupon 43 parts of 1-dodecyl-2-iminohexanhydropyrimidine hydrochloride are obtained as colourless crystals. The yield is 71% of the theoretical. After recrystallising twice from ethyl acetate, the substance melts at 58–59°.

EXAMPLE 7

*1-Dodecylbenzyl-2-Iminoimidazolidine Hydroiodide*

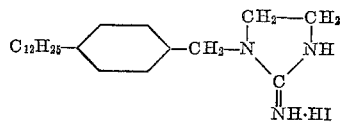

30.52 parts of S-methyl isothiourea hydroiodide are added at 10–20° to the solution of 44.52 parts of N-(4′-dodecylbenzyl)-1,2-diaminoethane in 100 parts by volume of methyl alcohol. The mixture is stirred for 3 hours at room temperature and then for 5 hours at boiling temperature. The methyl alcohol is then distilled off through a sloping condenser and the residue is heated for 2 hours at 130–140°. It is dissolved in 75 parts by volume of benzene. The solution is filtered and 300 parts by volume of petroleum ether are added whereupon the 1-(4′-dodecylbenzyl)-2-iminoimidazolidine hydroiodide is obtained as a wax-like mass. The yield is 57 parts which corresponds to 86.5% of the theoretical.

EXAMPLE 8

*1-Dodecyl-2-Iminoimidazolidine Hydrochloride*

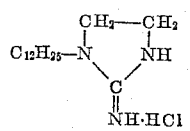

25.3 parts of S-methyl isothiourea hydrochloride are added to the solution of 45.6 parts of N-dodecyl-1.2-diaminoethane in 80 parts by volume of methanol at 20–25°. The solution is stirred for 1 hour at room temperature and for 5 hours under reflux. The methyl alcohol is then distilled off in the vacuum. The residue is recrystallised from ethyl acetate whereupon the dodecylaminoethyl guanidine hydrochloride is obtained as water soluble, colourles crystals which melt at 115° on decomposition. The susbtance has biocidal properties similar to those of the product described in Example 1 and can be used for the same purposes.

To produce the 1-dodecyl-2-iminoimidazolidine hydrochloride, it is not necessary to isolate this guanidine compound. The methyl alcoholic solution of β-dodecylaminoethyl guanidine hydrochloride obtained according to paragraph 1 is distilled off under normal pressure through a sloping condenser, the residue is heated for 1 hour at 125–130°, dissolved in 700 parts by volume of hot ethyl acetate and purified by filtration. After cooling to −10°, the 1-dodecyl-2-iminoimidazolidine hydrochloride crystallises out. It is filtered off, washed with a little ethyl acetate and dried. In a yield of 52 parts, corresponding to 90% of the theoretical, a product is obtained which melts at 110–113°. After recrystallising once from ethyl acetate, the more pure product melts at 119–120°.

If, instead of the 25.3 parts of S-methyl isothiourea hydrochloride, 37 parts of S-ethyl isothiourea hydrobromide or 28.1 parts of S-propyl isothiourea hydrochloride are used and only 400 parts by volume of ethyl acetate are used to dissolve the reaction product instead of 700 parts by volume and otherwise the same procedure is followed, then a similarly good yield of 1-dodecyl-2-imino-imidazolidine hydrobromide is obtained. M.P. 106–107°.

What I claim is:

1. The method that comprises reacting a diamino compound of the formula $$R—NH—A—NH_2$$

wherein

A represents a bivalent saturated hydrocarbon radical selected from the group consisting of α.β-alkylene, α.γ-alkylene and α.β-cyclohexylene radicals, and R represents a lipophilic radical selected from the group consisting of dodecylbenzyl and $C_{10}$ to $C_{14}$ alkyl radicals, with an isothiourea compound selected from the group consisting of S-lower alkyl- and S-aralkyl- isothiourea to form a guanidine compound of the formula

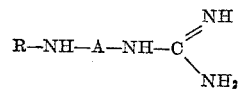

and heating it to a temperature within the range of 120–150° C. to form the corresponding 2-imino-1.3-diheterocycle.

2. The method according to claim 1 in which the isothiourea compound is S-methyl isothiourea.

3. The method that comprises reacting N-tetradecyl- 1.2-diaminoethane with S-methyl isothiourea to form a guanidine compound of the formula

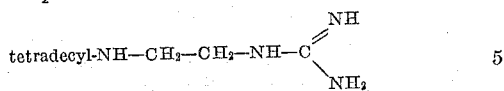

and heating it to a temperature within the range of 120–150° C. to form 1-tetradecyl-2-iminoimidazolidine.

4. The method that comprises reacting N-dodecyl-1.2-diaminocyclohexane with S-methyl isothiourea to form a guanidine compound of the formula

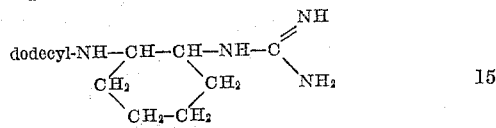

and heating it to a temperature within the range of 120–150° C. to form 4.5-tetramethylene-1-dodecyl-2-iminoimidazolidine.

5. The method that comprises reacting N-dodecyl-1.3-diaminopropane with S-methyl isothiourea to form a guanidine compound of the formula

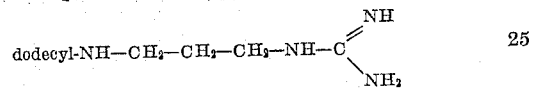

and heating it to a temperature within the range of 120–150° C. to form 1-dodecyl-2-iminohexahydropyrimidine.

6. The method that comprises reacting N-dodecyl-1.2-diaminoethane with S-methyl isothiourea to form a guanidine compound of the formula

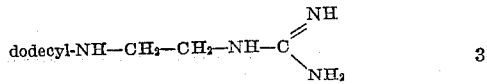

and heating it to a temperature within the range of 120–150° C. to form 1-dodecyl-2-iminoimidazolidine.

7. A compound of the formula

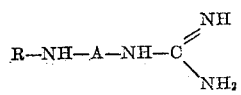

wherein

A represents a bivalent saturated hydrocarbon radical selected from the group consisting of α.β-alkylene, α.γ-alkylene and α.β-cyclohexylene radicals, and R represents a lipophilic radical selected from the group consisting of dodecylbenzyl and $C_{10}$ to $C_{14}$ alkyl radicals, 8. The compound of the formula

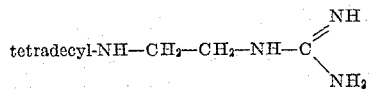

9. The compound of the formula

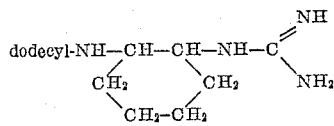

10. The compound of the formula

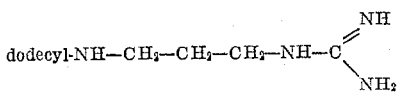

11. The compound of the formula

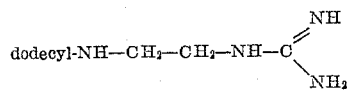

References Cited in the file of this patent

UNITED STATES PATENTS

| | | |
|---|---|---|
| 1,672,029 | Heyn | June 5, 1928 |
| 2,768,204 | Hechenbleikner | Oct. 23, 1956 |

OTHER REFERENCES

Birch: Jour. Chem. Soc. (London), pp. 410–411 (1957).